United States Patent [19]

Townsend

[11] 3,753,242

[45] Aug. 14, 1973

[54] MEMORY OVERLAY SYSTEM

[75] Inventor: James F. Townsend, Framingham, Mass.

[73] Assignee: Honeywell Information Systems Inc., Waltham, Mass.

[22] Filed: Dec. 16, 1971

[21] Appl. No.: 208,787

[52] U.S. Cl. ..... 340/172.5, 340/173 SP, 340/174 SP

[51] Int. Cl. .......... G11c 7/00

[58] Field of Search .......... 340/172.5, 173 SP, 340/174 SP

[56] References Cited

UNITED STATES PATENTS

| | | | |
|---|---|---|---|
| 3,659,275 | 4/1972 | Marshall | 340/172.5 |
| 3,230,513 | 1/1966 | Lewis | 340/172.5 |
| 3,395,392 | 7/1968 | Kulikauskas | 340/172.5 |
| 3,613,055 | 10/1971 | Varadi et al. | 340/173 SP |
| 3,248,708 | 4/1966 | Haynes | 340/172.5 |
| 3,517,171 | 6/1970 | Avizienis | 340/172.5 |
| 3,564,517 | 2/1971 | McLean et al. | 340/172.5 |
| 3,665,426 | 5/1972 | Gross et al. | 340/173 SP |

*Primary Examiner*—Paul J. Henon
*Assistant Examiner*—John P. Vandenburg
*Attorney*—John S. Solakian et al.

[57] ABSTRACT

A read only memory (ROM) and a random access memory (RAM) overlayed to provide for three modes of operation: (1) ROM enabled, RAM disabled except as indicated by a control memory; (2) ROM disabled, normal RAM operation, and/or (3) ROM enabled, RAM disabled regardless of indication from control memory.

15 Claims, 1 Drawing Figure

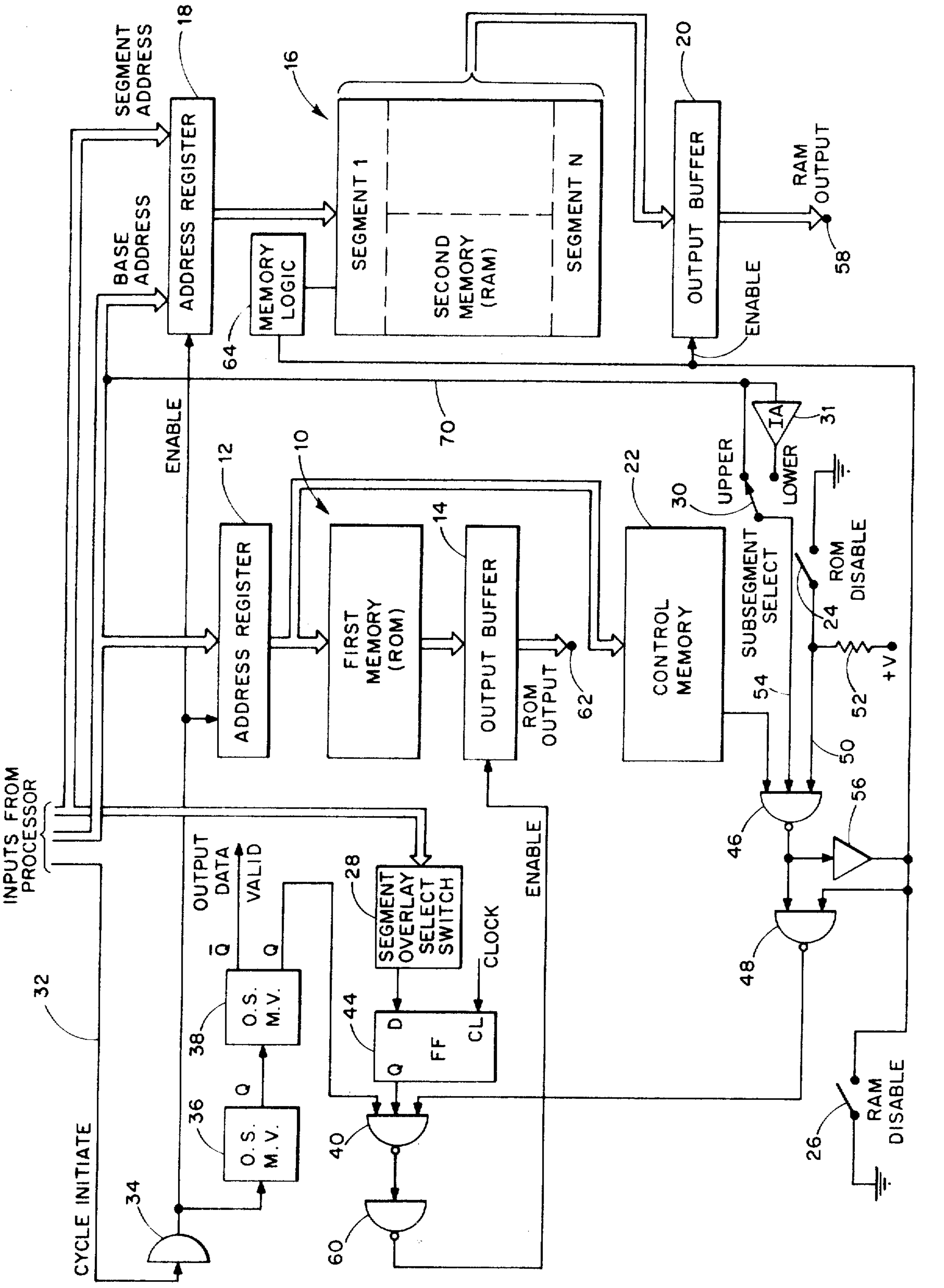
SEGMENT ADDRESS
BASE ADDRESS
ADDRESS REGISTER
MEMORY LOGIC
SEGMENT 1
SECOND MEMORY (RAM)
SEGMENT N
OUTPUT BUFFER
RAM OUTPUT
ENABLE
IA
UPPER
LOWER
ADDRESS REGISTER
FIRST MEMORY (ROM)
OUTPUT BUFFER
ROM OUTPUT
CONTROL MEMORY
SUBSEGMENT SELECT
ROM DISABLE
+V
INPUTS FROM PROCESSOR
CYCLE INITIATE
OUTPUT DATA VALID
SEGMENT OVERLAY SELECT SWITCH
CLOCK
O.S. M.V.
FF
RAM DISABLE

MEMORY OVERLAY SYSTEM

BACKGROUND OF THE INVENTION

The present invention relates generally to memory systems used in a data processor and more particularly to memory systems utilizing more than one memory.

Integration of a read only memory into a data processor having a main memory is usually provided on a substitute basis with a segment of the main memory. That is, a segment of the main memory is not included and therefore unavailable because of the addition of the read only memory. Usually the read only memory is provided with a plurality of storage spaces and depending upon one's requirements, not all of the spaces of the read only memory are utilized. Thus, effectively memory space provided for the read only memory function which is not utilized, is wasted since it cannot be used for the main memory function.

It is accordingly an object of the present invention to provide an improved integration of first and second memories in a data processing system.

It is another object of the invention to provide a memory system which includes a portion of a main memory overlayed by a read only memory so that (1) the read only memory and the overlayed portion of the main memory are enabled in accordance with a predetermined pattern; and/or (2) the read only memory is disabled and normal operation of the entire main memory is enabled; and/or (3) the read only memory is enabled and the overlayed portion of the main memory is disabled.

It is a further object of the invention to provide a read only memory which may be overlayed with any one of a plurality of segments of a main memory or subsegments thereof in a data processing system.

SUMMARY OF THE INVENTION

The purposes and objects of the present invention are satisfied by providing a memory system comprising first and second memories each having a plurality of storage locations, wherein each of the locations of the second memory have addresses corresponding to addresses of the locations of the first memory. A control memory is provided for indicating whether the storage locations of the first memory or the second memory are to be utilized in response to simultaneous addressing of both memories. The memory system may further include means for disabling either of said memories so that only one of the memories is responsive to the addressing of both memories. Further, where the second memory is comprised of a plurality of segments, the first memory and one of the segments as selected may be simultaneously addressed, the control memory indicating whether the first memory or the selected segment is to be utilized in response to the simultaneous addressing thereof.

BRIEF DESCRIPTION OF THE DRAWINGS

The advantages of the foregoing description of the present invention will become more apparent upon reading the accompanying detailed description in connection with the sole FIGURE which illustrates a schematic block diagram of the memory system of the invention.

DETAILED DESCRIPTION OF THE PREFERRED EMBODIMENT

The sole FIGURE illustrates a first memory 10 coupled with its address register 12 and its output buffer 14. A main or second memory 16 is shoWn with its address register 18 and its output buffer 20. Coupled with the address register 12 is the control memory 22. The first memory 10 may be a read only memory having a plurality of word storage locations, each word including a plurality of bits. The second memory 16 may be random access memory having a plurality of segments 1 through N, each segment having by way of example the same number of word storage locations as that contained in first memory 10. A further embodiment will be discussed hereinafter wherein each segment of memory 16 includes a greater number of word storage locations than that which is contained in memory 10.

Address registers 12 and 18 are coupled to receive address inputs from their associated processor (not shown). Control memory 22 is shown to receive its address input via address register 12. Control memory 22 includes a plurality of bit storage locations which are equal in number to the number of word storage locations contained in first memory 10. Each bit storage location in memory 22 indicates in response to addressing thereof whether a word storage location in memory 10 or a word storage location in a segement of memory 16 is to be utilized. Thus control memory 22 stores a binary one state if the first memory 10 is to be utilized and a binary zero state if the second memory 16 is to be utilized.

The first memory 10 and a segment of the second memory 16 are thus overlayed during normal operation of the system, that is, either memory 10 or memory 16 is utilized in response to the simultaneous addressing of both memories. If the ROM disable switch 24 is closed, this will disable the first memory 10 from being utilized. Thus with switch 26 open, each word storage location of memory 16 may be utilized. With switch 24 open and the RAM disable switch 26 closed, then the second memory 16 is disabled from being utilized in response to the addressing thereof and only the first memory 10 is utilized regardless of the contents of control memory 22. Segment overlay select switch 28 is utilized to control that segment in memory 16 which is to be overlayed by first memory 10. If the number of word storage locations in memory 10 is less than the number of word storage locations in a segment of memory 16, then a subsegment select switch 30 is utilized to control the overlay of memory 10 with the subsegment selected. The further logic shown in the sole FIGURE is utilized to control the operation of the memory system of the invention and will be best described with reference to the operation of the system.

For purposes of illustration let us assume that a first memory 10 includes $2^{11}$ (approximately 2000) word storage locations and that each segment of memory 16 includes a similar amount of word storage locations. Accordingly, control memory 22 also includes $2^{11}$ bit storage locations. In operation therefore, the system is enabled by means of a cycle initiate signal appearing on line 32, the cycle initiate signal being received from the data processor associated with the memory system of the invention. The cycle initiate signal is a high level signal of short duration and is coupled by means of buffer 34 to enable address registers 12 and 18 for receipt of the address inputs from the data processor. After the cycle initiate signal goes to a low level, the registers 12 and 18 have their address contacts latched so that no further inputs may be received until the cycle initiate signal again goes high. The negative going edge of the cycle inititate signal triggers a first one shot multivibrator 36 thereby producing a high level at its Q output for a first time period. At the end of the first time period, the Q output of the one shot multivibrator 36 goes from a high level to a low level thereby triggering one shot multivibrator 38 whose Q output goes from a low level to a high level for a second time period. The $\overline{Q}$ output of one shot multivibrator 38 assumes the opposite state of the Q output thereby indicating to the processor the time interval during which the output data from either the first memory 10 or the second memory 16 is valid. The output data valid signal may have been provided at the output of gate 40 should it be desired to limit such signal to those situations where the memory 10 is selected. In such case a separate output data valid signal would be generated when memory 16 is utilized. The Q output of multivibrator 38 is coupled to one input of NAND gate 40. Another input to NAND gate 40 is received via segment overlay select switch 28. Switch 28 is coupled to receive a second address received by address register 18 indicating which of the N segments of memory 16 is addressed. Switch 28 may be for example a multiple position switch which functions to present a high level on line 42 when the segment of memory 16 addressed is the same as the segment which is to be overlayed by first memory 10. Line 42 is coupled to the D input of flipflop 44, which operates such that the signal on line 42 is coupled to the Q output of flip-flop 44 when a clock signal is received. The third input of NAND gate 40 is received from control memory 22 via NAND gates 46 and 48. As indicated hereinbefore, the control memory 22 will produce a binary one or high level signal when a ROM location is addressed and a binary zero or low level signal when a RAM location is addressed. NAND gate 46 will produce a low level output signal when all of its inputs are at a high level. When switch 24 is in the open position, as shown, line 50 will be at a high level via resistor 52 and voltage +V. Assume for now, that the output of switch 30 on line 54 is also a high level. With a low level signal at the output of NAND gate 46, a low level signal will also be generated at the output of amplifier 56. A low level signal at at least one input of NAND gate 48 will thereby produce a high level signal at the output of NAND gate 48. A low level signal at the output of amplifier 56 will disable the output buffer 20 of second memory 16 thereby inhibiting an output at terminal 58. Output buffer 20 is otherwise enabled by memory logic 64 associated with memory 16. With high level signals at all inputs of NAND gate 40 a low level signal at the output thereof will generate a high level signal via further NAND gate 60. This will enable output buffer 14 of memory 10 so that data is received at output terminal 62.

Thus during operation of the memory system of the invention, with the switches 24 and 26 in the positions shown in the sole FIGURE, buffer 14 will be enabled if the segment address received by register 18 indicates that segment which is selected by segement overlay select switch 28 and if control memory 22 indicates that a memory 10 word storage location be used for that particular location addressed. In such case therefore, buffer 14 is enabled and buffer 20 is disabled. If control memory 22 indicates that a word storage location of memory 16 be utilized, then buffer 14 will be disabled via gates 46, 48, 40 and 60. For normal operation of the second memory 16 regardless of the indication from control memory 22, switch 24 is closed so that a low level signal, as indicated by the symbol for circuit ground, is coupled to one input of gate 46. This produces a high level signal at the output of gate 46 which enables buffer 20 via amplifier 56 and which produces a low level signal at the output of gate 48 so that, via gates 40 and 60, buffer 14 is disabled. Thus buffer 14 is disabled regardless of the contents of the control memory 22. The memory 16 may be disabled by means of switch 26 which when closed produces a low level signal at its output via the low level signal at its input as indicated by the symbol for circuit ground. THis low level signal at the output of switch 26 disables buffer 20 and enables output buffer 14 of memory 10. Output buffer 14 is enabled because the low level signal at the input of gate 48 connected to switch 26 produces a high level signal at its output independent of the contents of control memory 22 so that gate 40 is enabled if of course the Q outputs of flip-flop 44 and multivibrator 48 have also produced a high level signal.

We have thus seen how the three basic modes of operation of the memory system of the invention are achieved. In summary, in a first mode of operation, the memories 10 and 16 are enabled selectively under the control of control memory 22. In a second mode of operation, the memory 10 is disabled and the memory 16 is enabled independent of the contents of control memory 22. In a third mode of operation, the memory 10 is enabled and the memory 16 is disabled regardless of the indication of control memory 22. It is thus seen that the three modes of operation are achieved with a minimal amount of elements to provide system operation which has a high degree of flexibility depending upon the total system's requirements.

We have assumed in the above discussion that the number of word storage locations in memory 10 is equal to the number of word storage locations in each segment of memory 16. In many applications, the memory segments are provided in basic increments of the number of word storage locations. A typical number of word storage locations for a segment of a memory is approximately 4000 words. If the first memory 10 is provided with just 2000 words for example, then the upper half or the lower half of the segment in memory 16 selected must be indicated so that memory 10 will overlap with the subsegment selected. This is provided by means of subsegment select switch 30 and inverting amplifier 31 coupled to the base address inputs and gate 46. More particularly, assume that the base address has twelve lines which provide an address for 4000 word storage locations. Without the subsegment select switch 30 and the coupling thereof, it will be seen that memory 10 will overlap with both the upper half and the lower half of the selected segment of memory 16. This is the case because memory 10 will react to the addressing of the lowest ordered eleven lines of the base address which lowest ordered eleven lines provides an address for approximately 2000 word storage locations. When the base address for register 18 goes over the approximate 2000 word number, i.e., when the next line or twelfth line is activated, the memory 10 then recycles starting from its first address. By coupling line 70 to the highest ordered line, or twelfth line of the base address, the highest ordered line being the twelfth line indicative of a $2^{11}$ value, selection between the upper and lower halves of the selected segment may be achieved. Line 70 is coupled to the upper terminal of switch 30 and line 70 is also connected to the input of inverting amplifier 31 whose output is coupled to the lower terminal of switch 30. The output of switch 30 is coupled to one input of gate 46 so that if such output on line 54 is a high level signal, then a memory 10 word storage location may be indicated. If a low level signal appears on line 54, then memory 10 will be disabled. Thus if the lower half of a segment in memory 16 is desired for overlap with memory 10, the subsegment select switch 30 must be switched to the lower terminal in which case since the lower 2000 words of the segment is addressed, line 70 will be a low level signal thereby providing a high level signal at the output of amplifier 31 and therefore a high level signal on line 54, thereby potentially enabling the use of memory 10. If the upper 2000 words of a segment in memory 16 are being addressed, then line 70 will be a high level signal in which case and if select switch 30 is still connected to the lower terminal, a low level signal will appear at the output of amplifier 31 thereby inhibiting the use of memory 10. If switch 30 is switched to the upper terminal therof, then a high level signal will appear on line 54 potentially enabling the use of memory 10. It can also be seen that the arrangement of subsegment select switch 30 may be such that different fractions of a segment in memory 16 may be selected such as for example in a system whose segment includes approximately 4000 word storage locations subsegments divided into 1000 word storage locations may be discretely selected for operation with the memory 10.

It will less be seen tha the objects set forth above, among those made apparent in the preceding description are efficiently obtained and certain changes may be made in the above constructions without departing from the scope of the invention. It is intended that all matter contained in the above description or shown in the accompanying drawings shall be interpreted as illustrative and not in a limiting sense. For example, address registers 12 and 18 may have been reduced to one common register to memories 10 and 16. Also the address input to memory 22 need not have been coupled to the output of register 12. Such input to memory 22 may have been provided directly from the processor to a separate register for the control memory 22 or may be coupled from a common address register for each of the memories. It should be further understood that the control memory 22 may have been included as part of memory 10; that is, by providing an extra bit storage location in each word storage location of memory 10 and then determining from that extra bit storage location the indication of whether the output of memory 10 (with the extra bit location masked) or the output of memory 16 is to be utilized, and coupling such indication to gate 46, effective operation may have been achieved. It should be further understood that the various gating functions may have been achieved by various combinations of gates and further elements withoiut departing from the scope of the invention.

Having described the invention, what is claimed as new and novel and secured by Letters Patent is:

1. A memory system comprising:

A. a first memory having a plurality of storage locations;

B. a second memory having a plurality of storage locations, addresses of each of said locations of said second memory corresponding toa ddresses of said first memory storage locations, said second memory comprising a plurality of segments, each of said segments having a plurality of storage locations, wherein the number of storage locations in said first memory is equal to the number of storage locations in one of said segments;

C. means for selecting one of said segments of said second memory;

D. means for simultaneously addressing both said first memory and the selected segment of said second memory; and E. a control memory for indicating whether the storage locations of said first memory of the selected segment of said second memory are to be utilized when both said first memory and the selected segment of said second memory are addressed.

2. A system as defined in claim 1 wherein said control memory is addressed concurrently with the first and second memories.

3. A system as defined in claim 2, further comprising means for disabling said first memory so that only said second memory is responsive to the addressing of both said first and second memories.

4. A system as defined in claim 2, further comprising means for disabling said second memory so that only said first memory is responsive to the addressing of both said first and second memories.

5. A memory system comprising:

A. a first memory having a plurality of storage locations;

B. a second memory having a plurality of storage locations, addresses of each of said locations of said second memory corresponding to addresses of said first memory storage locations, said second memory comprising a plurality of segments, each of said segments having a plurality of storage locations, wherein the number of storage locations in said first memory is less than the number of storage locations in one of said segments;

C. means for selecting one of said segments of said second memory;

D. means for simultaneously addressing both said first memory and the selected segment of said second memory;

E. a control memory for indicating whether the storage locations of said first memory or of said second memory are to be utilized; and F. means for inhibiting the utilization of said first memory when said means for addressing is addressing a predetermined portion of said selected segment.

6. A system as defined in claim 5 wherein said control memory is addressed concurrently with said first and second memories.

7. A memory system comprising:

A. a first memory having a plurality of word storage locations, each of said word storage locations having a plurality of bit storage locations;

B. a second memory having a plurality of word storage locations, each of said word storage locations having a plurality of bit storage locations;

C. a control memory having a plurality of bit storage locations, wherein the number of said bit storage locations in said control memory is equal to the number of word storage locations in said first memory, each of said bit storage locations in said control memory indicating either a first binary state or a second binary state;

D. means for substantially simultaneously addressing the word storage locations of said first and second memories and the bit storage locations of said control memory, said means for addressing including means for providing corresponding identical representations of each of said locations in each of said memories;

E. means for enabling the utilization of the addressed word storage location in said first memory when the addressed bit storage location of said control memory indicates said first binary state; nd F. means for enabling the utiliztion of the addressed word storage location in said second memory when the addressed bit storage location of said control memory indicates said second binary state.

8. A system as defined in claim 7 further comprising:

A. means for generating a first signal;

B. gate means responsive to said first signal, said gate means coupled to said control memory; and wherein C. said first memory is inhibited from being utilized in response to said first signal regardless of the binary state indicated by the addressed bit storage location of said control memory.

9. A system as defined in claim 8 further comprising:

A. means for generating a second signal;

B. means for coupling said gate means for response to said second signal; and wherein C. said second memory is inhibited from being utilized in response to said second signal regardless of the binary state indicated by the addressed bit storage location of said control memory.

10. A system as defined in claim 7 wherein said first memory is a read only memory and wherein said second memory is the main memory of a data processor.

11. A system as defined in claim 7 wherein the number of word storage locations in said first memory is equal to the number of word storage locations in said second memory.

12. A system as defined in claim 7 wherein:

A. said second memory includes a plurality of segments, each of said segments including a plurality of word storage locations equal in number to the number of word storage locations in said first memory; and further comprising:

B. means for selecting one of said segments;

C. means for designating the one of said segments which is to be simultaneously addressed with said first memory by said means for addressing; and D. means for enabling said first memory for utilization as indicated by said control memory when said selected segment and said designated segment are the same.

13. A system as defined in claim 7 wherein:

A. the number of word storage locations in said first memory is less than the number of word storage locations in said second memory; and further comprising:

B. means for inhibiting the utilization of said first memory when said means for addressing is addressing a predetermined portion of said second memory.

14. A system as defined in claim 7 wherein:

A. the number of word storage locations in said first memory is one half of the number of word storage locations in said second memory; and further comprising:

B. means for inhibiting the utilization of said first memory when a first half of said second memory is addressed; and C. means for enabling the utilization of said first memory as indicated by said control memory when a second half of said second memory is addressed.

15. A system as defined in claim 7 wherein the address provided by said means for addressing is the address of a location in said second memory.

* * * * *